United States Patent
Fujita (10) Patent No.: US 11,239,757 B2
(45) Date of Patent: Feb. 1, 2022

(54) POWER CONVERSION APPARATUS, AND POWER SUPPLY APPARATUS

(71) Applicant: FUJI ELECTRIC CO., LTD., Kanagawa (JP)

(72) Inventor: Satoru Fujita, Tachikawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/794,219

(22) Filed: Feb. 18, 2020

(65) Prior Publication Data
US 2020/0321874 A1    Oct. 8, 2020

(30) Foreign Application Priority Data
Apr. 4, 2019    (JP) .............................. JP2019-072031

(51) Int. Cl.
| | | |
|---|---|---|
| *H02M 3/158* | (2006.01) | |
| *H02M 3/00* | (2006.01) | |
| *H02M 3/07* | (2006.01) | |
| *H02M 7/483* | (2007.01) | |
| *H02M 1/00* | (2006.01) | |

(52) U.S. Cl.
CPC ......... *H02M 3/1584* (2013.01); *H02M 3/003* (2021.05); *H02M 3/07* (2013.01); *H02M 7/4837* (2021.05); *H02M 1/0067* (2021.05)

(58) Field of Classification Search
CPC .. H02M 7/003; H02M 7/4837; H02M 1/0067; H02M 3/003; H02M 3/07; H02M 3/158; H02M 3/1584
See application file for complete search history.

(56) References Cited

U.S. PATENT DOCUMENTS

2015/0009734 A1*   1/2015   Stahl ................ H02M 7/53871
                                                              363/98
2017/0294859 A1*   10/2017   Marvin .................. H02P 27/04

FOREIGN PATENT DOCUMENTS

JP            2013192383 A       9/2013

\* cited by examiner

*Primary Examiner* — Jue Zhang (57) ABSTRACT

There is provided a power conversion apparatus including: a first power supply terminal and a second power supply terminal which are paired with each other; a third power supply terminal and a fourth power supply terminal which are paired with each other; 1st to nth switches sequentially connected between the first power supply terminal and the fourth power supply terminal; 1st to nth rectifier devices sequentially connected between the first power supply terminal and the third power supply terminal; and each of 1st to (n–1)th capacitors which is physically disposed and electrically connected between an Nth terminal between an Nth switch and a (N+1)th switch, and an Nth terminal between an Nth rectifier device and a (N+1)th rectifier device, in which the 1st to nth switches are disposed to be physically aligned with the 1st to nth rectifier devices, respectively.

12 Claims, 9 Drawing Sheets

POWER CONVERSION APPARATUS, AND POWER SUPPLY APPARATUS

The contents of the following Japanese patent application(s) are incorporated herein by reference: 2019-072031 filed in JP on Apr. 4, 2019

BACKGROUND

1. Technical Field

The present invention relates to a power conversion apparatus and a power supply apparatus.

2. Related Art

In the related art, a power conversion apparatus such as a step-up chopper drives a switching device to perform a power conversion (see, for example, Patent Literature 1).
[Patent Literature 1] Japanese Unexamined Patent Application Publication No. 2013-192383

However, in a case where the switching device is driven at a high frequency a surge voltage is generated due to an inductance of wiring. In a case where a withstand voltage of a device is increased to address this problem, a power loss increases due to a cause such as an increase in power consumption of the device.

SUMMARY

In order to solve the above described problem, a first aspect of the present invention provides a power conversion apparatus. The power conversion apparatus may include a first power supply terminal and a second power supply terminal which are paired with each other. The power conversion apparatus may include a third power supply terminal and a fourth power supply terminal which are paired with each other. The power conversion apparatus may include 1st to nth switches (n is an integer of 2 or more) which are sequentially electrically and physically connected in series between the first power supply terminal and the fourth power supply terminal. The power conversion apparatus may include 1st to nth rectifier devices which are sequentially, electrically and physically connected in series between the first power supply terminal and the third power supply terminal. The power conversion apparatus may include 1st to (n−1)th capacitors, wherein an Nth capacitor (N=1, 2, ... n−1) is physically disposed between an Nth switch side terminal between an Nth switch and a (N+1)th switch, and an Nth rectifier device side terminal between an Nth rectifier device and a (N+1)th rectifier device, and is electrically connected between the Nth switch side terminal and the Nth rectifier device side terminal. The 1st to nth switches may be disposed to be physically aligned with the 1st to nth rectifier devices, respectively.

The 1st to nth switches and the 1st to nth rectifier devices may be disposed on two physically parallel straight lines.

Each capacitor may be disposed to be physically orthogonal to the two straight lines.

The 1st to nth switches may be incorporated in at least one switch module. The 1st to nth rectifier devices may be incorporated in at least one rectifier device module.

Each switch module may expose each switch side terminal. Each rectifier device module may expose each rectifier device side terminal. Each capacitor may be attached to any of the at least one switch module and any of the at least one rectifier device module.

Each rectifier device may be a diode. The power conversion apparatus may further include an nth capacitor which is physically disposed between an nth switch side terminal between the nth switch and the fourth power supply terminal, and an nth rectifier device side terminal between the nth rectifier device and the third power supply terminal, and which is electrically connected between the nth switch side terminal and the nth rectifier device side terminal.

The power conversion apparatus may further include an inductor which stores energy by passing a current in a case where any of the 1st to nth switches is turned on, and releases the energy as a current in a case where the switch is turned off.

The first power supply terminal and the second power supply terminal may be power input terminals. The third power supply terminal and the fourth power supply terminal may be power output terminals. The power conversion apparatus may be a step-up chopper.

The first power supply terminal and the second power supply terminal may be power output terminals. The third power supply terminal and the fourth power supply terminal may be power input terminals. The power conversion apparatus may be a step-down chopper.

Each rectifier device may be a switch. The first power supply terminal and the second power supply terminal may be power output terminals. The third power supply terminal and the fourth power supply terminal may be power input terminals. The power conversion apparatus may be an inverter.

A second aspect of the present invention provides a power supply apparatus. The power supply apparatus may include a plurality of the power conversion apparatuses according to the first aspect connected in parallel. The power supply apparatus may include a power supply either connected to the first power supply terminal and the second power supply terminal, or connected to the third power supply terminal and the fourth power supply terminal.

At least one of the 1st to nth switches and the 1st to nth rectifier devices may include a wide band gap semiconductor.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. Further, not all the combinations of features described in the embodiments are essential for means to solve the problem in the invention.

1. Power Supply Apparatus

Figure 1:
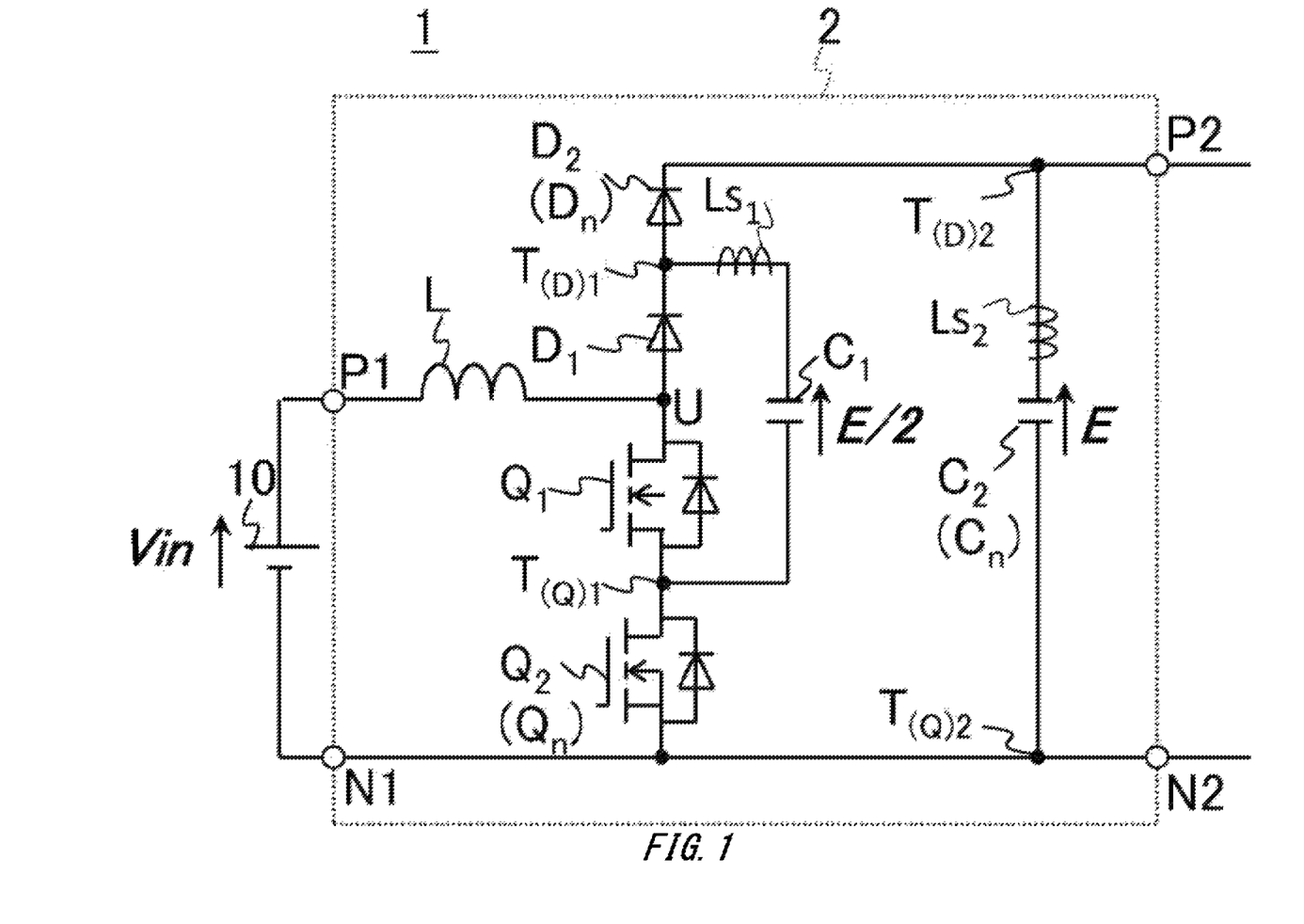
FIG. 1 shows a power supply apparatus 1 according to the present embodiment.

FIG. 1 shows a power supply apparatus 1 according to the present embodiment. The power supply apparatus 1 includes a power supply 10 and a power conversion apparatus 2. Note that "E", "E/2", or the like shown in bold italics in the drawing indicates a potential at each point.

The power supply 10 is a voltage source of direct current power, and can supply a voltage of Vin (V) as an example in the embodiment. For example, the power supply 10 may be a circuit that supplies power by rectifying alternating current power at a commercial frequency (for example, 50 Hz or 60 Hz) to the direct current power by a rectifier circuit including a rectifier diode and a capacitor.

1-1. Power Conversion Apparatus 2

The power conversion apparatus 2 is a so-called three-level step-up chopper as an example in the embodiment, boosts the voltage Vin supplied from the power supply 10 in three stages, and supplies the boosted voltage to a load (not shown). The power conversion apparatus 2 includes a first positive power supply terminal P1, a first negative power supply terminal N1, a second positive power supply terminal P2, a second negative power supply terminal N2, an inductor L, n diodes D (also referred to as diodes $D_1$ to $D_n$), n switches Q (also referred to as switches $Q_1$ to $Q_n$), and n capacitors C (also referred to as capacitors $C_1$ to $C_n$). Note that each of subscripts "1", . . . , "n" indicates the number of a device. Further, "n" is an integer of 2 or more, and is "2" as an example in the embodiment.

The first positive power supply terminal P1 and the first negative power supply terminal N1 are examples of a first power supply terminal and a second power supply terminal, and are paired with each other. The first positive power supply terminal P1 and the first negative power supply terminal N1 are power input terminals as examples in the embodiment, and are connected to positive and negative terminals of the power supply 10.

The second positive power supply terminal P2 and the second negative power supply terminal N2 are examples of a third power supply terminal and a fourth power supply terminal, and are paired with each other. The second positive power supply terminal P2 and the second negative power supply terminal N2 are power output terminals as examples in the embodiment, and are connected to both ends of the load (not shown). The second positive power supply terminal P2 and the second negative power supply terminal N2 can output a voltage of E (V) higher than Vin (V) (710 V when Vin is 565 V as an example).

The inductor L stores energy by passing a current in a case where any of the switches $Q_1$, $Q_2$ is turned on, and releases the energy as a current in a case where the switch is turned off. Accordingly, the voltage Vin of the power supply 10 is boosted and is appropriately released. Note that as an example in the embodiment, the inductor L is connected between the first positive power supply terminal P1 and a node U between the diodes $D_1$ to $D_n$ and the switches $Q_1$ to $Q_n$, but the inductor L may be connected to another position such as a position between the first negative power supply terminal N1 and the switch $Q_n$.

Each of the diodes $D_1$ to $D_n$ (the diodes $D_1$ to $D_2$ as examples in the embodiment) is an example of a rectifier device. The diodes $D_1$ to $D_n$ are sequentially and electrically connected in series between the first positive power supply terminal P1 and the second positive power supply terminal P2 (as an example in the embodiment, between the node U and the second positive power supply terminal P2), and function as backflow prevention diodes. Each diode D may include a wide band gap semiconductor. For example, each diode D may include a semiconductor which includes any of SiC, GaN, diamond, AlN, or ZnO and has a band gap greater (wider) than a silicon semiconductor.

Here, between a diode $D_N$ (where N=1, 2, . . . , n, and is each 1 and 2 as an example in the embodiment), and a diode $D_{N+1}$ or the second positive power supply terminal P2, a rectifier device side terminal $T_{(D)N}$ may be positioned. For example, the rectifier device side terminal $T_{(D)1}$ may be positioned between the diode $D_1$ and the diode $D_2$, and the rectifier device side terminal $T_{(D)2}$ may be positioned between the diode $D_2$ and the second positive power supply terminal P2.

The switches $Q_1$ to $Q_n$ (the switches $Q_1$ to $Q_2$ as examples in the embodiment) are sequentially and electrically connected in series between the first positive power supply terminal P1 and the second negative power supply terminal N2 (as an example in this embodiment, between the node U and the second negative power supply terminal N2). Each switching device Q may include a wide band gap semiconductor (for example, the same type of the wide gap semiconductor as the diode D). Each switching device Q may be a reverse blocking IGBT, a MOSFET, a bipolar transistor, or the like.

Here, between a switch $Q_N$, and a switch $Q_{N+1}$ or the second negative power supply terminal N2, a switch side terminal $T_{(Q)N}$ may be positioned. For example, the switch side terminal $T_{(Q)1}$ may be positioned between the switch $Q_1$ and the switch $Q_2$, and the switch side terminal $T_{(Q)2}$ may be positioned between the switch $Q_2$ and the second negative power supply terminal N2.

Each capacitor $C_N$ is electrically connected between the switch side terminal $T_{(Q)N}$ and the rectifier device side terminal $T_{(D)N}$. For example, the capacitor $C_1$ is electrically connected between the switch side terminal $T_{(Q)1}$ and the rectifier device side terminal $T_{(D)1}$. Further, the capacitor $C_2$ is electrically connected between the switch side terminal $T_{(Q)2}$ and the rectifier device side terminal $T_{(D)2}$.

Here, the capacitor $C_n$ (the capacitor $C_2$ as an example in the embodiment) is charged and discharged to generate the voltage of E (V), and smoothes the current flowing through the load (not shown). The capacitor $C_n$ may be externally connected to the second positive power supply terminal P2 and the second negative power supply terminal N2 without being included in the power conversion apparatus 2.

Further, the capacitors $C_1$ to $C_{n-1}$ (the capacitor $C_1$ as an example in the embodiment) may function as so-called flying capacitors. For example, the capacitor $C_1$ may have a load side voltage value (potential difference between both ends of the capacitor $C_2$) set to E (V) by being repeatedly charged and discharged by drives of the switching devices $Q_1$ to $Q_2$. As an example, the voltage of the capacitor $C_1$ may be kept at approximately E/2 (V) by a pre-charge circuit (not shown) during a stop of the power conversion apparatus 2, and by a control described below during an operation of the power conversion apparatus 2. Accordingly three-level voltages (for example, 0 (V), E/2 (V), and E (V)) are generated at the node U.

The capacitors $C_1$ to $C_n$ may be film capacitors or ceramic capacitors. Note that an unintended wiring inductance $L_{SN}$ may be present in a wiring from the switch side terminal $T_{(Q)N}$ to the rectifier device side terminal $T_{(D)N}$ through the capacitor $C_N$.

According to the above described power supply apparatus 1, the power boosted from Vin (V) to E (V) can be supplied to the load. Further, since the diode D and the switch Q include wide band gap semiconductors, it is possible to reduce a switching loss. Further, since it is possible to speed up switching, the inductor L and the capacitor C can be downsized for the power conversion apparatus 2 to be downsized.

1-2. Operation of Power Conversion Apparatus 2

Figure 2:
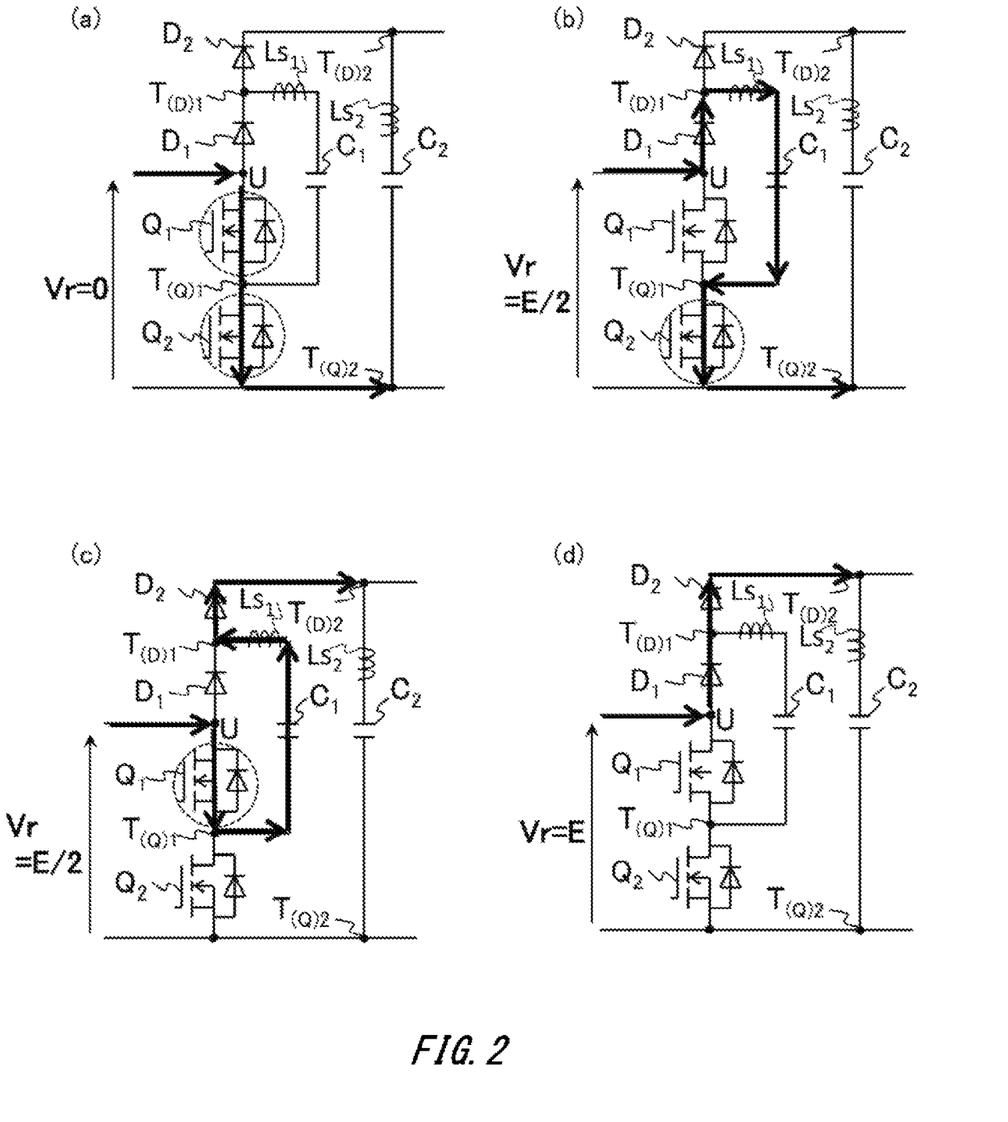
FIG. 2 shows an operation of a power conversion apparatus 2.

FIG. 2 shows an operation of a power conversion apparatus 2. As shown in FIG. 2, each switch Q has an on/off period and a cycle controlled by a control signal from a control section (not shown).

Here, a thick line arrow in the drawing indicates a current flow, and a broken line circle indicates a switching device in an ON state. Further, "Vr" shown in bold indicates a voltage between both ends of a series circuit of the switches $Q_1$ to $Q_2$, that is, an input voltage to the node U.

First, in a state shown in FIG. 2(a), both of the switches $Q_1$, $Q_2$ are turned on. Accordingly, the voltage Vr becomes 0 [V], and an induced current flowing through the inductor L increases.

Further, in a state shown in FIG. 2(b), the switch $Q_1$ is turned off and the switch $Q_2$ is turned on. Accordingly, a voltage boosted by an induced voltage of the inductor L is supplied to the capacitor $C_1$ through a current path in the drawing, the capacitor $C_1$ is charged, and the voltage between both ends becomes approximately E/2 (V). At this time, the voltage boosted by the inductor L, and the voltage Vr are also approximately E/2 (V).

Further, in a state shown in FIG. 2(c), the switch $Q_1$ is turned on and the switch $Q_2$ is turned off. Accordingly, the voltage of E/2 boosted by the inductor L and the voltage of E/2 discharged from the capacitor $C_1$ are supplied to the capacitor $C_2$, and the capacitor $C_2$ is charged such that the voltage between both ends becomes E (V) to be supplied to the load. Here, a capacitance of the capacitor $C_1$ is set to be large with respect to an amount of an electric charge charged or discharged in a single operation of the above described charge or discharge, and a voltage fluctuation accompanying the charge and discharge is set to be small (for example, 10% or less of E/2).

Further, in a state shown in FIG. 2(d), both of the switches $Q_1$, $Q_2$ are turned off. At this time, the voltage boosted higher than E/2 by the induced voltage of the inductor L is supplied to the capacitor $C_2$, and the capacitor $C_2$ is further charged.

Here, in a case where a voltage ratio between a low voltage side and a high voltage side is 1:2, that is, in a case where the voltage Vr is E/2 (V), the state may switch between the ones in FIG. 2(b) and FIG. 2(c) alternately for the period to be equal. Accordingly, a charge amount and a discharge amount of the capacitor $C_1$ are equalized, and the voltage is kept at a constant value in a vicinity of E/2 (V). In a case where the voltage Vin of the power supply 10 is 0 (V) to E/2 (V), in order to keep the current of the inductor L constant, the state may switch between the ones in FIG. 2(a) to FIG. 2(c) for an average value of Vr to be 0 (V) to E/2 (V). In this case, the state in FIG. 2(b) and the state in FIG. 2(c) are controlled alternately with the state in FIG. 2(a) being in between, for the period to be equal. In a case where the voltage Vin is E/2 (V) to E (V), in order to keep the current of the inductor L constant, the state may switch between the ones in FIG. 2(b) to FIG. 2(d) for the average value of Vr to be E/2 (V) to E (V). In this case, the state in FIG. 2(b) and the state in FIG. 2(c) are controlled alternately with the state in FIG. 2(d) being in between, for the period to be equal.

In the above described operation, in a case where the switching from the state in FIG. 2(b) to the state in FIG. 2(c), or the switching from the state in FIG. 2(c) to the state in FIG. 2(d) is performed, a surge voltage is generated due to an inrush current, a reversal and an interruption of the current, or the like occurring in the wiring inductance $L_{SN}$.

1-3. Physical Arrangement of Devices of Power Conversion Apparatus 2

Figure 3:
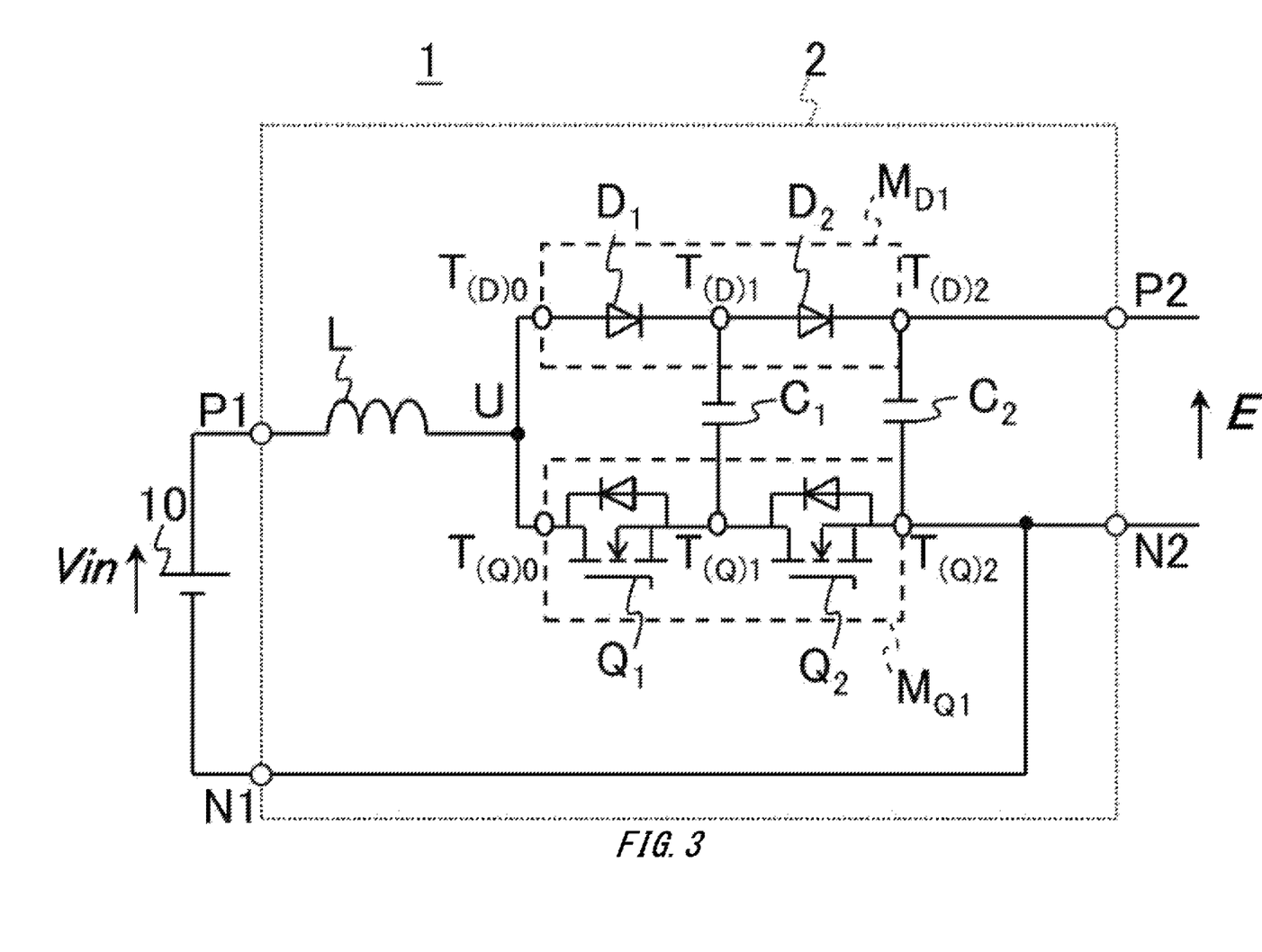
FIG. 3 shows a physical arrangement of devices in the power conversion apparatus 2.

FIG. 3 shows a physical arrangement of devices in a power conversion apparatus 2. The switches $Q_1$ to $Q_n$ (the switches $Q_1$ to $Q_2$ as examples in the embodiment), and the diodes $D_1$ to $D_n$ (the diodes $D_1$ to $D_2$ as examples in the embodiment) are physically connected in series, respectively and in other words, the switches are connected to form a single straight line and the diodes are connected to form a single straight line. The switches $Q_1$ to $Q_n$ and the diodes $D_1$ to $D_n$ may be disposed on two physically parallel straight lines, respectively.

Further, the switches $Q_1$ to $Q_n$ (the switches $Q_1$ to $Q_2$ as examples in the embodiment) are disposed to be physically aligned with the diodes $D_1$ to $D_n$ (the diodes $D_1$ to $D_2$ as examples in the embodiment), respectively. In the drawing, the switch $Q_1$ is disposed to be physically aligned with the diode $D_1$, and the switch $Q_2$ is disposed to be physically aligned with the diode $D_2$.

Here, as examples in the embodiment, the switches $Q_1$ to $Q_n$ may be incorporated in a switch module $M_{Q1}$, and the diodes $D_1$ to $D_n$ may be incorporated in a diode module $M_{D1}$. The switch module $M_{Q1}$ may expose each switch side terminal $T_{(Q)}$ ($T_{(Q)1}$, $T_{(Q)2}$ as examples in the embodiment), and the diode module $M_{D1}$ may expose each rectifier device side terminal $T_{(D)}$ ($T_{(D)1}$, $T_{(D)2}$ as examples in the embodiment). In addition, the switch module $M_{Q1}$ may expose the switch side terminal $T_{(Q)0}$ positioned between the switch $Q_1$ and the first positive power supply terminal P1, and the diode module $M_{D1}$ may expose the rectifier device side terminal $T_{(D)0}$ positioned between the diode $D_1$ and the first positive power supply terminal P1, and the switch module $M_{Q1}$ and the diode module $M_{D1}$ may be electrically connected to the first positive power supply terminal P1 via the switch side terminal $T_{(Q)0}$ and the rectifier device side terminal $T_{(D)0}$.

Each of the capacitors $C_N$ (as an example in the embodiment, N is each integer of 1 and 2) is physically disposed between the switch side terminal $T_{(Q)N}$ and the rectifier device side terminal $T_{(D)N}$. For example, the capacitor $C_1$ is physically disposed between the switch side terminal $T_{(Q)1}$ and the rectifier device side terminal $T_{(D)1}$, and the capacitor $C_2$ is physically disposed between the switch side terminal $T_{(Q)2}$ and the rectifier device side terminal $T_{(D)2}$.

Each capacitor C may be disposed to be physically orthogonal to the straight line on which the switches $Q_1$ to $Q_n$ are disposed and the straight line on which the diodes $D_1$ to $D_n$ are disposed. Each capacitor C may be attached to the switch module $M_{Q1}$ and the diode module $M_{D1}$ via the switch side terminal $T_{(Q)}$ and the rectifier device side terminal $T_{(D)}$ exposed from the switch module $M_{Q1}$ and the diode module $M_{D1}$.

According to the above described power conversion apparatus 2, the switches $Q_1$ to $Q_n$ are electrically and physically connected in series (the switches $Q_1$ to $Q_2$ as examples in the embodiment), diodes $D_1$ to $D_n$ are electrically and physically connected in series (the diodes $D_1$ to $D_2$ as examples in the embodiment), the switches $Q_1$ to $Q_n$ are disposed to be physically aligned with the diodes $D_1$ to $D_n$, respectively and each of the capacitors $C_1$ to $C_n$ (the capacitors $C_1$ to $C_2$ as examples in the embodiment) is physically disposed between the switch side terminal $T_{(Q)}$ between switches Q, and the rectifier device side terminal $T_{(D)}$ between diodes D so as to be electrically connected between the terminals $T_{(Q)}$ and $T_{(D)}$. Therefore, the current path from the terminal $T_{(Q)}$ between the switches Q to the terminal $T_{(D)}$ between the diodes D through the capacitor C is shortest (or almost shortest), the wiring inductance is reduced, and thus, it is possible to reduce the surge voltage generated in the current path due to the drive of the switch Q. Accordingly, a device destruction due to the surge voltage can be prevented. In addition, unlike a case where a withstand voltage of the device is increased, it is possible to prevent the switching loss and to prevent the apparatus from becoming large in size.

The switches $Q_1$ to $Q_n$ and the diodes $D_1$ to $D_n$ are disposed on the two parallel straight lines, and each capacitor C is disposed to be orthogonal to the two straight lines. Therefore, the current path from the switch side terminal $T_{(Q)}$ between the switches Q to the rectifier device side terminal $T_{(D)}$ between the diodes D through the capacitor C is shortest, the wiring inductance is reduced, and thus, it is possible to reliably reduce the surge voltage generated in the current path due to the drive of the switch Q.

Since each switch Q is incorporated in at least one switch module $M_{Q1}$ and each diode D is incorporated in at least one diode module $M_{D1}$, it is possible to manufacture the power conversion apparatus 2 by disposing the switch module $M_{Q1}$ and the diode module $M_{D1}$. Therefore, it is possible to easily manufacture the power conversion apparatus 2.

Further, each capacitor C is attached to the switch module $M_{Q1}$ and the diode module $M_{D1}$ via the switch side terminal $T_{(Q)}$ and the rectifier device side terminal $T_{(D)}$ exposed from the switch module $M_{Q1}$ and the diode module $M_{D1}$. Therefore, it is possible to more easily manufacture the power conversion apparatus 2.

1-4. External Configuration of Power Conversion Apparatus 2

Figure 4:
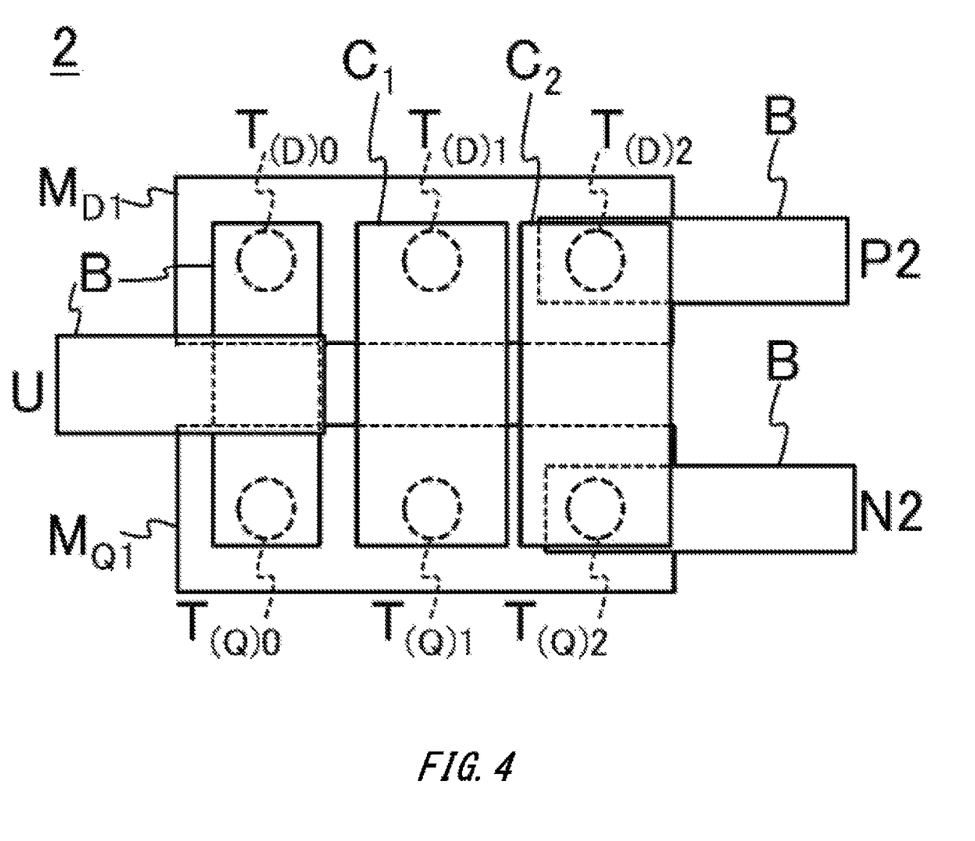
FIG. 4 shows an external configuration of the power conversion apparatus 2.

FIG. 4 shows an external configuration of the power conversion apparatus 2.

The power conversion apparatus 2 may include the switch module $M_{Q1}$ including the switches $Q_1$ to $Q_2$, the diode module $M_{D1}$ including the diodes $D_1$ to $D_2$, the capacitors $C_1$, $C_2$, and one or a plurality of wiring bars B.

The switch module $M_{Q1}$ and the diode module $M_{D1}$ may be formed as a rectangular parallelepiped in a plan view, respectively and may expose the switch side terminals $T_{(Q)0}$ to $T_{(Q)2}$ and the rectifier device side terminals $T_{(D)0}$ to $T_{(D)2}$ along longitudinal directions, respectively. The switch side terminal $T_{(Q)0}$ and the rectifier device side terminal $T_{(D)0}$ may be electrically connected to each other via the wiring bar B.

The capacitors $C_1$, $C_2$ may be disposed on the switch side terminal $T_{(Q)}$ and the rectifier device side terminal $T_{(D)}$ to be physically orthogonal to the straight line on which switches $Q_1$ to $Q_2$ are disposed and the straight line on which diodes $D_1$ to $D_2$ are disposed.

2. Modification Example (1)

Figure 5:
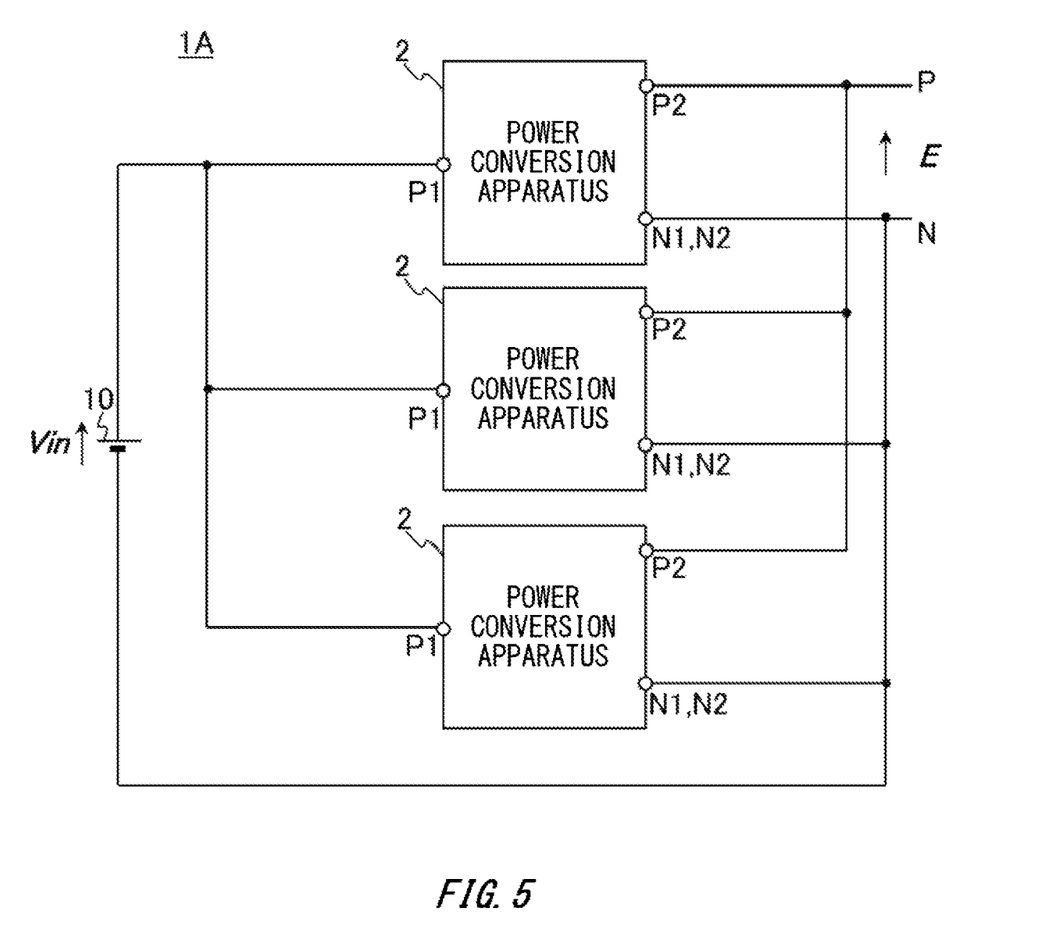
FIG. 5 shows a power supply apparatus 1A according to Modification Example (1).

FIG. 5 shows a power supply apparatus 1A according to Modification Example (1).

The power supply apparatus 1A according to Modification Example (1) includes a plurality (three in the drawing) of power conversion apparatuses 2 connected in parallel, and the power supply 10 connected to the first positive power supply terminal P1 and the first negative power supply terminal N1 in each power conversion apparatus 2.

The second positive power supply terminal P2 of each power conversion apparatus 2 is connected to a positive output terminal P, and the second negative power supply terminal N2 of each power conversion apparatus 2 is connected to a negative output terminal N. Accordingly, the power supply apparatus 1A boosts the voltage Vin supplied from the power supply 10 by each power conversion apparatus 2 and outputs the boosted voltage from the positive output terminal P and the negative output terminal N.

According to the above described power supply apparatus 1A, since the plurality of power conversion apparatuses 2 are connected in parallel, it is possible to increase a current capacity of the power supply apparatus 1A as a whole.

Note that in the drawing, the first negative power supply terminal N1 and the second negative power supply terminal N2 are illustrated as the same terminal, but may be separate terminals. Further, in a case where each power conversion apparatus 2 does not include the capacitor $C_n$ (the capacitor $C_2$ as an example in the Modification Example), a common capacitor $C_n$ may be connected to the second positive power supply terminal P2 and the second negative power supply terminal N2 of each power conversion apparatus 2. As an example, the common capacitor C may be electrically connected between the positive output terminal P and the negative output terminal N.

3. Modification Example (2)

Figure 6:
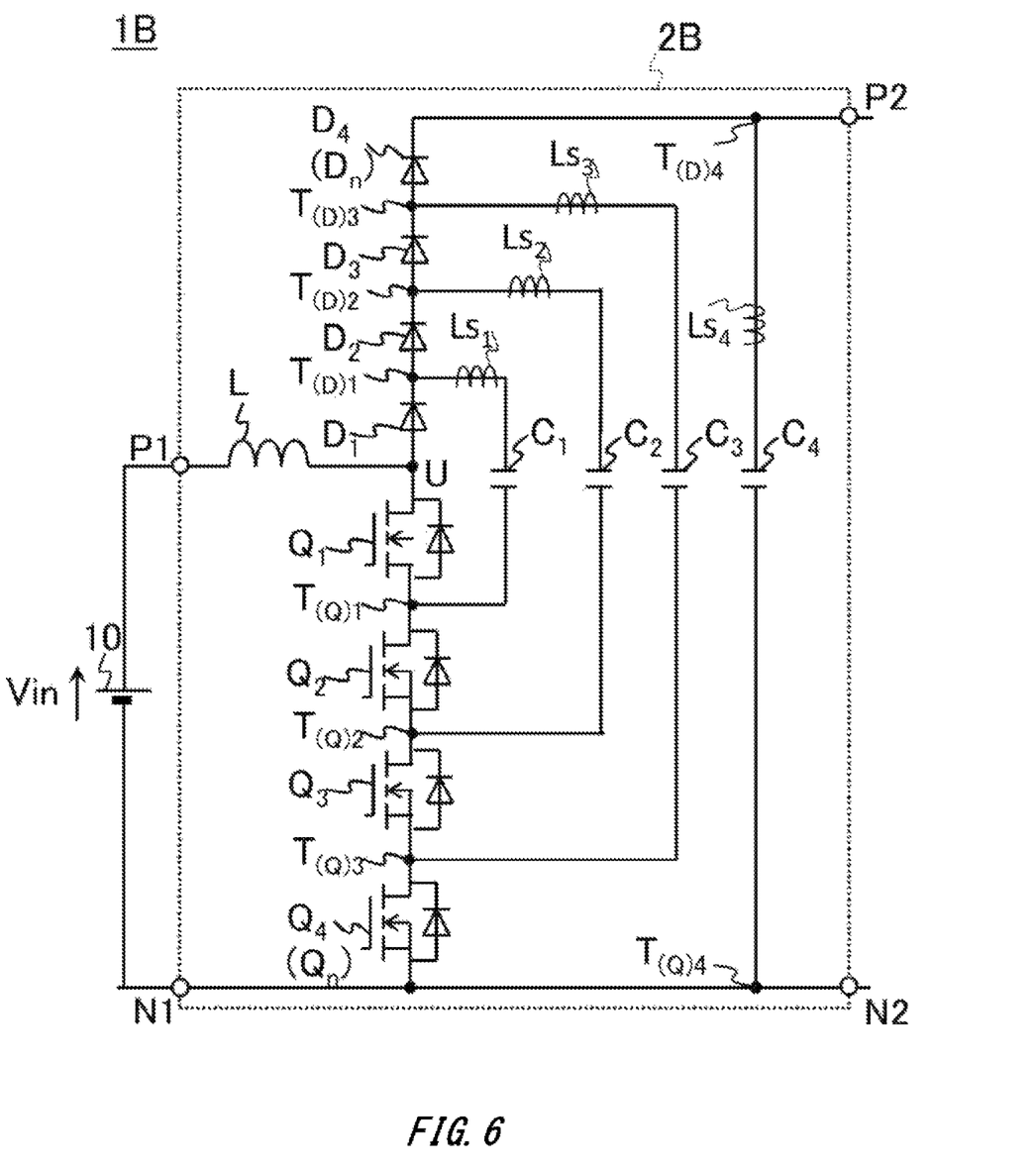
FIG. 6 shows a power supply apparatus 1B according to Modification Example (2).

FIG. 6 shows a power supply apparatus 1B according to Modification Example (2). The power conversion apparatus 2B of the power supply apparatus 1B according to the Modification Example includes the four diodes $D_1$ to $D_4$ which are sequentially and electrically connected in series between the first positive power supply terminal P1 and the second positive power supply terminal P2, the four switches $Q_1$ to $Q_4$ which are sequentially and electrically connected in series between the first positive power supply terminal P1 and the second negative power supply terminal N2, and the four capacitors $C_1$ to $C_4$ which are electrically connected between the switch side terminal $T_{(Q)}$ and the rectifier device side terminal $T_{(D)}$.

The power conversion apparatus 2 is a so-called five-level step-up chopper, receives the power from the power supply 10, boosts the voltage in five stages, and supplies the boosted voltage to the load (not shown). For example, the switches $Q_1$ to $Q_4$ may be driven by any known method in the related art during an operation of the power conversion apparatus 2B, and charge voltages of the capacitors $C_1$ to $C_4$ may be kept at E/4 (V), 2E/4 (V), 3E/4 (V), E (V), respectively. Note that the unintended wiring inductance $L_{SN}$ may be present in the wiring from the switch side terminal $T_{(Q)N}$ (N is each integer of 1 to 4 in the Modification Example) to the rectifier device side terminal $T_{(D)N}$ through the capacitor $C_N$.

Figure 7:
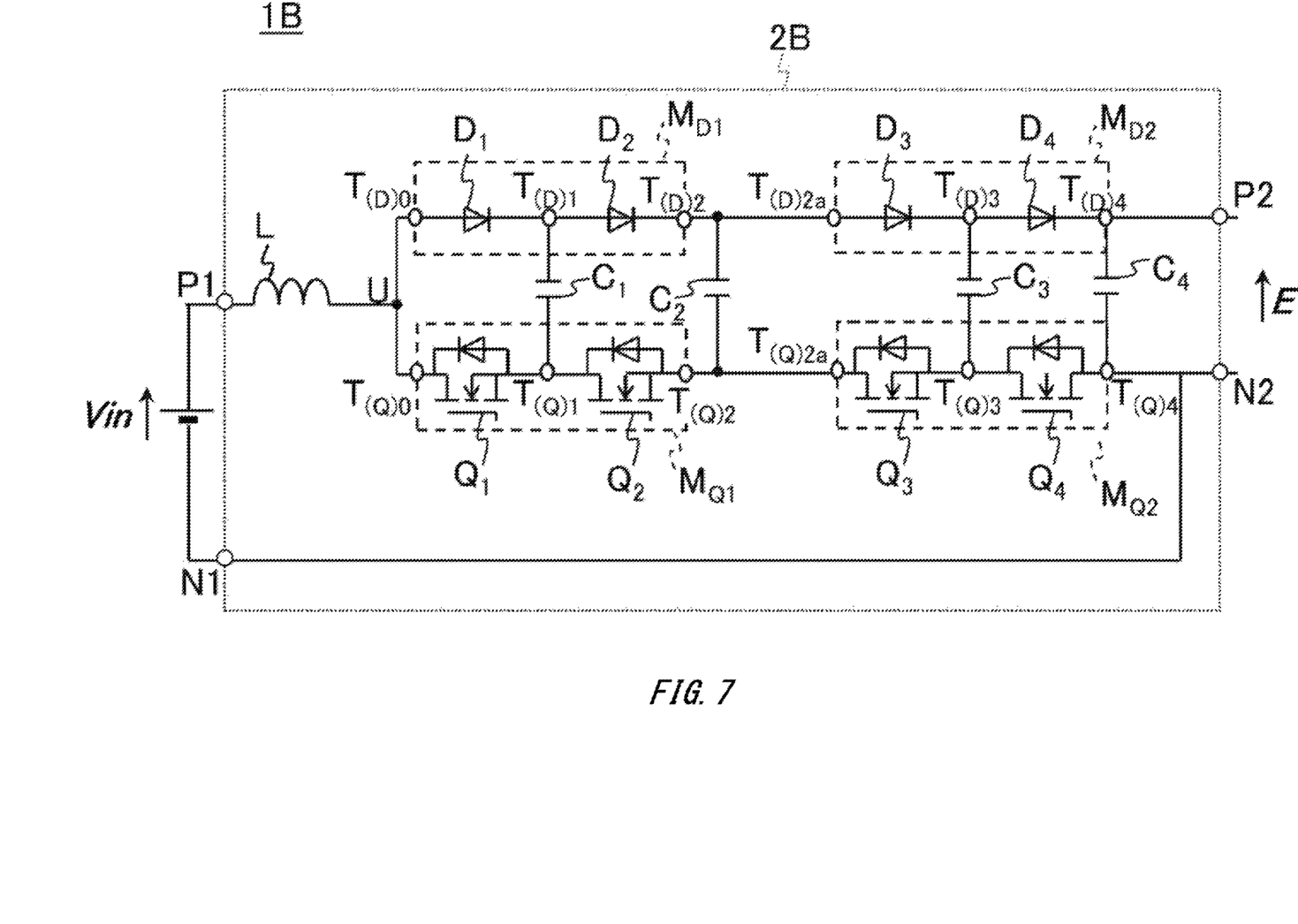
FIG. 7 shows a physical arrangement of devices in a power conversion apparatus 2B.

FIG. 7 shows a physical arrangement of devices in a power conversion apparatus 2B. The switches $Q_1$ to $Q_4$ and the diodes $D_1$ to $D_4$ are physically connected in series, respectively and are disposed on the two physically parallel straight lines, respectively as an example. Further, the switches $Q_1$ to $Q_4$ are disposed to be physically aligned with the diodes $D_1$ to $D_4$, respectively. In the drawing, the switch $Q_1$, the switch $Q_2$, the switch $Q_3$, and the switch $Q_4$ are disposed to be physically aligned with the diode $D_1$, the diode $D_2$, the diode $D_3$, and the diode $D_4$, respectively.

Here, in Modification Example (2), the switches $Q_1$ to $Q_2$ are incorporated in the switch module $M_{Q1}$, and the switches $Q_3$ to $Q_4$ are incorporated in a switch module $M_{Q2}$. The switch module $M_{Q1}$ exposes the switch side terminals $T_{(Q)0}$ to $T_{(Q)2}$, and the switch module $M_{Q2}$ exposes the switch side terminals $T_{(Q)3}$, $T_{(Q)4}$. In addition, the switch module $M_{Q2}$ may expose the switch side terminal $T_{(Q)2a}$ positioned between the switch $Q_2$ and the switch $Q_3$, and may be electrically connected to the switch module $M_{Q1}$ via the switch side terminal $T_{(Q)2a}$.

Further, the diodes $D_1$ to $D_2$ are incorporated in the diode module $M_{D1}$, and the diodes $D_3$ to $D_4$ are incorporated in a diode module $M_{D2}$. The diode module $M_{D1}$ exposes the rectifier device side terminals $T_{(D)0}$ to $T_{(D)2}$, and the diode module $M_{D2}$ exposes the rectifier device side terminals $T_{(D)3}$, $T_{(D)4}$. In addition, the diode module $M_{D2}$ may expose the rectifier device side terminal $T_{(D)2a}$ positioned between the diode $D_2$ and the diode $D_3$, and may be electrically connected to the diode module $M_{D1}$ via the rectifier device side terminal $T_{(D)2a}$.

Each of the capacitors $C_N$ (N is each integer from 1 to 4 as an example in the Modification Example) is physically disposed between the switch side terminal $T_{(Q)N}$ and the rectifier device side terminal $T_{(D)N}$. For example, the capacitor $C_1$, the capacitor $C_2$, the capacitor $C_3$, and the capacitor $C_4$ are physically disposed between the switch side terminal $T_{(Q)1}$ and the rectifier device side terminal $T_{(D)1}$, between the switch side terminal $T_{(Q)2}$ and the rectifier device side terminal $T_{(D)2}$, between the switch side terminal $T_{(Q)3}$ and the rectifier device side terminal $T_{(D)3}$, and between the switch side terminal $T_{(Q)4}$ and the rectifier device side terminal $T_{(D)4}$, respectively. Each capacitor C may be disposed to be physically orthogonal to the straight line on which the switches $Q_1$ to $Q_4$ are disposed and the straight line on which the diodes $D_1$ to $D_4$ are disposed.

Figure 8:
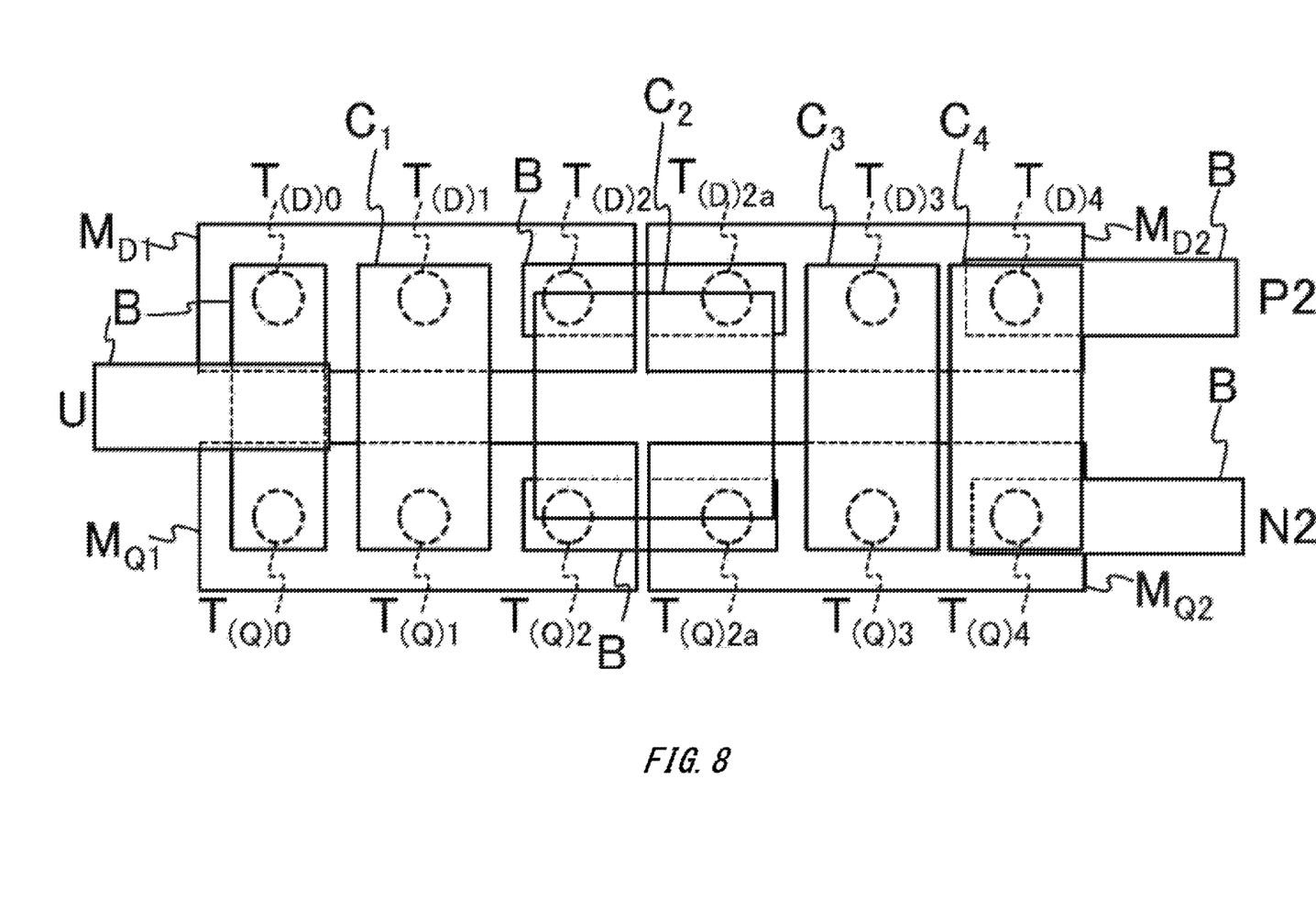
FIG. 8 shows an external configuration of the power conversion apparatus 2B.

FIG. 8 shows an external configuration of the power conversion apparatus 2B. The power conversion apparatus 2B may include the switch module $M_{Q1}$ including the switches $Q_1$ to $Q_2$, the switch module $M_{Q2}$ including the switches $Q_3$ to $Q_4$, the diode module $M_{D1}$ including the diodes $D_1$ to $D_2$, the diode module $M_{D2}$ including diodes $D_3$ to $D_4$, the capacitors $C_1$ to $C_4$, and one or a plurality of wiring bars B.

The switch modules $M_{Q1}$, $M_{Q2}$, and the diode module $M_{D1}$, $M_{D2}$ may be formed as a rectangular parallelepiped in a plan view, respectively, and may expose the switch side terminals $T_{(Q)0}$ to $T_{(Q)2}$, $T_{(Q)2a}$ to $T_{(Q)4}$, and the rectifier device side terminals $T_{(D)0}$ to $T_{(D)2}$, $T_{(D)2a}$ to $T_{(D)4}$, along the longitudinal directions, respectively. The rectifier device side terminals $T_{(D)2}$, $T_{(D)2a}$ may be electrically connected to each other via the wiring bar B. Further, the switch side terminals $T_{(Q)2}$, $T_{(Q)2a}$ may be electrically connected to each other via the wiring bar B. Accordingly the switch modules $M_{Q1}$, $M_{Q2}$ are physically connected to each other.

The capacitors $C_1$ to $C_4$ may be disposed on the switch side terminal $T_{(Q)}$ and the rectifier device side terminal $T_{(D)}$ to be physically orthogonal to the straight line on which switches $Q_1$ to $Q_4$ are disposed and the straight line on which diodes $D_1$ to $D_4$ are disposed. Among them, the capacitor $C_2$ may be physically disposed between a wiring bar B connecting the switch side terminal $T_{(Q)2}$ and the switch side terminal $T_{(Q)2a}$, and another wiring bar B connecting the rectifier device side terminal $T_{(D)2}$ and the rectifier device side terminal $T_{(D)2a}$. Note that the capacitor $C_2$ may be physically disposed on at least one of positions between the switch side terminal $T_{(Q)2}$ and the rectifier device side terminal $T_{(D)2}$, and between the switch side terminal $T_{(Q)2a}$ and the rectifier device side terminal $T_{(D)2a}$.

According to the above described power conversion apparatus 2B, the diode modules $M_{D1}$, $M_{D2}$ are connected in series, the switch modules $M_{Q1}$, $M_{Q2}$ are connected in series, respectively and the capacitors C are disposed between the rectifier device side terminals $T_{(D)}$ and the switch side terminals $T_{(Q)}$, respectively, and thus it is possible to form a five-level step-up chopper. Similarly by increasing the numbers of the diode modules $M_D$, the switch modules $M_Q$, and the capacitors C, it is possible to form a step-up chopper of any level higher than the five-level one.

4. Modification Example (3)

Figure 9:
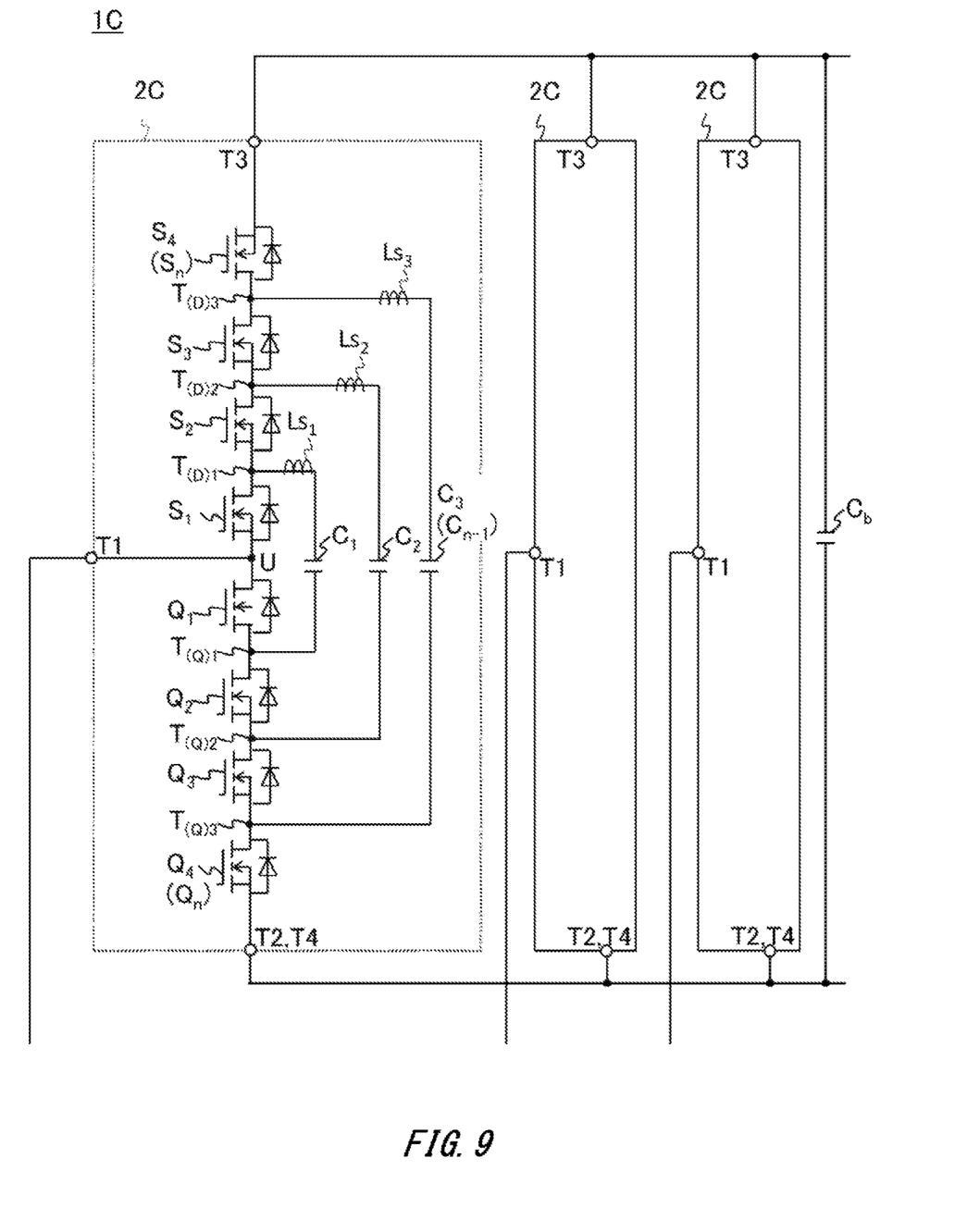
FIG. 9 shows a power supply apparatus 1C according to Modification Example (3).

FIG. 9 shows a power supply apparatus 1C according to Modification Example (3). The power supply apparatus 1C according to the Modification Example includes three power conversion apparatuses 2C and a capacitor $C_b$.

4-1. Power Conversion Apparatus 2C

Each power conversion apparatus 2C has a first power supply terminal $T_1$ and a second power supply terminal $T_2$ which are paired with each other, a third power supply terminal $T_3$ and a fourth power supply terminal $T_4$ which are paired with each other, the inductor L, n rectifier devices S (also referred to as rectifier devices $S_1$ to $S_n$), the n switches Q (also referred to as the switches $Q_1$ to $Q_n$), and the (n–1) capacitors C (also referred to as the capacitors $C_1$ to $C_{n-1}$).

Here, each power conversion apparatus 2C according to the Modification Example may be an apparatus which performs a bidirectional power conversion. For example, each power conversion apparatus 2C functions as the rectifier circuit which rectifies the alternating current power input from the first power supply terminal $T_1$ and the second power supply terminal $T_2$ so as to output the rectified power from the third power supply terminal $T_3$ and the fourth power supply terminal $T_4$, and functions as an inverter circuit which performs a DC/AC conversion on the direct current power input from the third power supply terminal $T_3$ and the fourth power supply terminal $T_4$ so as to output the converted power from the first power supply terminal $T_1$ and the second power supply terminal $T_2$. In a case where each power conversion apparatus 2C functions as the inverter circuit, the three power conversion apparatuses 2C may function as single-phase inverters or may function as three-phase inverters. Note that the power conversion apparatus 2C may function only as one of the rectifier circuit and the inverter circuit.

As examples in the Modification Example, the first power supply terminal $T_1$ and the second power supply terminal $T_2$ are input/output terminals for the alternating current power, function as the power input terminals in a case where the power conversion apparatus 2C functions as the rectifier circuit, and function as the power output terminals in a case where the power conversion apparatus 2C functions as the inverter circuit. The first power supply terminal $T_1$ and the second power supply terminal $T_2$ may be connected to each of the alternating current power supply and the load (not shown). The first power supply terminal $T_1$ and the second power supply terminal $T_2$ may be connected to the load via the rectifier circuit (not shown).

As examples in the Modification Example, the third power supply terminal $T_3$ and the fourth power supply terminal $T_4$ are input/output terminals for the direct current power, function as the power output terminals in a case where the power conversion apparatus 2C functions as the rectifier circuit, and function as the power input terminals in a case where the power conversion apparatus 2C functions as the inverter circuit. The third power supply terminal $T_3$ and the fourth power supply terminal $T_4$ may be connected to each of the capacitor $C_b$ and a DC/AC inverter (not shown). Note that in FIG. 9, the second power supply terminal $T_2$ and the fourth power supply terminal $T_4$ are illustrated as the same terminal, but may be separate terminals.

The rectifier devices $S_1$ to $S_n$ (the rectifier devices $S_1$ to $S_4$ as examples in the Modification Example) are sequentially and electrically connected in series between the first power supply terminal $T_1$ and the third power supply terminal $T_3$ (between the node U and the third power supply terminal $T_3$ as an example in the Modification Example). Each rectifier device S may be a switch, for example, a reverse blocking IGBT, a MOSFET, a bipolar transistor, or the like. Each rectifier device S may include a wide band gap semiconductor. For example, each rectifier device S may include a semiconductor which includes any of SiC, GaN, diamond, AlN, or ZnO and has a band gap greater (wider) than a silicon semiconductor. The rectifier device side terminal $T_{(D)N}$ may be positioned between a rectifier device $S_N$ (where N is each integer of 1 to 3 in the Modification Example) and a rectifier device $S_{N+1}$. For example, the rectifier device side terminal $T_{(D)1}$ may be positioned between the rectifier device $S_1$ and the rectifier device $S_2$, and the rectifier device side terminal $T_{(D)2}$ may be positioned between the rectifier device $S_2$ and the rectifier device $S_3$.

The switches $Q_1$ to $Q_n$ (the switches $Q_1$ to $Q_4$ as examples in the Modification Example) are sequentially and electrically connected in series between the first power supply terminal $T_1$ and the fourth power supply terminal $T_4$ (between the node U and the fourth power supply terminal $T_4$ as an example in the Modification Example). The switch side terminal $T_{(Q)N}$ may be positioned between the switch $Q_N$ and the switch $Q_{N+1}$. For example, the switch side terminal $T_{(Q)1}$ may be positioned between the switch $Q_1$ and the switch $Q_2$, and the switch side terminal $T_{(Q)2}$ may be positioned between the switch $Q_2$ and the switch $Q_3$.

Each capacitor $C_N$ (N is each integer from 1 to 3 as examples in the Modification Example) is electrically connected between the switch side terminal $T_{(Q)N}$ and the rectifier device side terminal $T_{(D)N}$. Each capacitor $C_N$ may function as a clamp capacitor which clamps a voltage. Note that the unintended wiring inductance $L_{SN}$ may be present in the wiring from the switch side terminal $T_{(Q)N}$ (N is each integer of 1 to 3 in the Modification Example) to the rectifier device side terminal $T_{(D)N}$ through the capacitor $C_N$.

4-2. Capacitor $C_b$

The capacitor $C_b$ functions as an output side smoothing capacitor of the rectifier circuit in a case where the power conversion apparatus 2C functions as the rectifier circuit, and functions as an input side smoothing capacitor of the inverter circuit in a case where the power conversion apparatus 2C functions as the inverter circuit.

Note that the third power supply terminal $T_3$ and the fourth power supply terminal $T_4$ may be connected to a direct current power supply instead of the capacitor $C_b$, and the direct current power supply may be the rectifier circuit which rectifies an alternating current supplied from a power system. Further, the capacitor $C_b$ may be included in each power conversion apparatus 2C, and may be connected between the rectifier device side terminal between the rectifier device $S_4$ and the third power supply terminal $T_3$, and the switch side terminal between the switch $Q_4$ and the fourth power supply terminal $T_4$.

In the above described power supply apparatus 1C, similar to the above described Modification Example (2), FIG. 7, and FIG. 8, each of the switches $Q_1$ to $Q_n$ (the switches $Q_1$ to $Q_4$ as examples in the Modification Example) may be physically connected in series, and each of the rectifier devices $S_1$ to $S_n$ (the rectifier devices $S_1$ to $S_4$ as examples in the Modification Example) may be physically connected in series, and the switches and the rectifier devices may be disposed on two physically parallel straight lines, respectively, as an example. Further, the switches $Q_1$ to $Q_n$ may be disposed to be physically aligned with the rectifier devices $S_1$ to $S_n$, respectively.

Further, the switches $Q_1$ to $Q_n$ may be incorporated in one or a plurality of switch modules $M_Q$, and the rectifier devices $S_1$ to $S_n$ may be incorporated in one or a plurality of rectifier device modules $M_S$. Each switch module $M_Q$ may expose each switch side terminal $T_{(Q)}$ ($T_{(Q)1}$ to $T_{(Q)3}$ as examples in the Modification Example), and each rectifier device module $M_S$ may expose each rectifier device side terminal $T_{(D)}$ ($T_{(D)1}$ to $T_{(D)3}$ as examples in the embodiment). Moreover, each of the capacitors $C_N$ (N is each integer from 1 to 3) may be physically disposed between the switch side terminal $T_{(Q)N}$ and the rectifier device side terminal $T_{(D)N}$. Each capacitor C may be disposed to be physically orthogonal to the straight line on which the switches $Q_1$ to $Q_n$ are disposed and the straight line on which the rectifier device $S_1$ to $S_n$ are disposed. Each capacitor C may be attached to the switch module $M_{Q1}$ and the rectifier device module $M_{S1}$ via the switch side terminal $T_{(Q)}$ and the rectifier device side terminal $T_{(D)}$ exposed from the switch module $M_{Q1}$ and the rectifier device module $M_{S1}$.

5. Other Modification Examples

Note that in the above described embodiment and the Modification Example, the first positive power supply terminal P1 and the first negative power supply terminal N1 of the power conversion apparatuses 2, 2B have been described as the power input terminals, the second positive power supply terminal P2 and the second negative power supply terminal N2 have been described as the power output terminals, and the power conversion apparatuses 2, 2B have been described as the step-up choppers. However, the first positive power supply terminal P1 and the first negative power supply terminal N1 may be set to be the power output terminals, the second positive power supply terminal P2 and the second negative power supply terminal N2 may be set to be the power input terminals, and the power conversion apparatuses 2, 2B may be set to be a step-down chopper.

Further, the description has been made in which each switch module $M_Q$ has two switches Q, each diode module $M_D$ has two diodes D, and each rectifier device module $M_S$ has two rectifier devices S, but each switch module $M_Q$ may have three or more switches Q, each diode module $M_D$ may have three or more diodes D, and each rectifier module $M_S$ may have three or more rectifier device S.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1, 1A to 1C. power supply apparatus; 2, 2B, 2C. power conversion apparatus; 10. power supply; B. wiring bar; C. capacitor; D. diode; L. inductor; $L_S$. wiring inductance; $M_D$. diode module; $M_Q$. switch module; $M_S$. rectifier device module; N1. first negative power supply terminal; N2. second negative power supply terminal; P1. first positive power supply terminal; P2. second positive power supply terminal; Q. switch; S. rectifier device; $T_1$. first power supply terminal; $T_2$. second power supply terminal; $T_3$. third power supply terminal; $T_4$. fourth power supply terminal; $T_{(Q)}$. switch side terminal; $T_{(D)}$. rectifier device side terminal.

What is claimed is:

1. A power conversion apparatus comprising:
a first power supply terminal and a second power supply terminal which are paired with each other;
a third power supply terminal and a fourth power supply terminal which are paired with each other;
$1^{st}$ to nth switches (n is an integer of 2 or more) which are sequentially, electrically, and physically connected in series between the first power supply terminal and the fourth power supply terminal;
$1^{st}$ to nth rectifier devices which are sequentially, electrically, and physically connected in series between the first power supply terminal and the third power supply terminal;
$1^{st}$ to (n−1)th capacitors, wherein an Nth capacitor (N=1, 2, . . . , n−1) is physically disposed between an Nth switch side terminal between an Nth switch and a (N+1)th switch, and an Nth rectifier device side terminal between an Nth rectifier device and a (N+1)th rectifier device, and is electrically connected between the Nth switch side terminal and the Nth rectifier device side terminal;
$1^{st}$ to (n−1)th wiring inductors each in respective series connection with the $1^{st}$ to (n−1)th capacitors; and
an inductor in series with the second power supply terminal, the inductor storing energy by passing a current in a case where any of the $1^{st}$ to nth switches is turned on, and releases the energy as a current in a case where the any of the $1^{st}$ to nth switches is turned off,
wherein the $1^{st}$ to nth switches are disposed to be physically aligned with the $1^{st}$ to nth rectifier devices, respectively.

2. The power conversion apparatus according to claim 1, wherein the $1^{st}$ to nth switches and the $1^{st}$ to nth rectifier devices are disposed on two physically parallel straight lines, and
each capacitor is disposed to be physically orthogonal to the two straight lines.

3. The power conversion apparatus according to claim 1, wherein the $1^{st}$ to nth switches are incorporated in at least one switch module, and
the $1^{st}$ to nth rectifier devices are incorporated in at least one rectifier device module.

4. The power conversion apparatus according to claim 3, wherein each switch module exposes each switch side terminal, and each rectifier device module exposes each rectifier device side terminal, and
each capacitor is attached to any of the at least one switch module and any of the at least one rectifier device module.

5. The power conversion apparatus according to claim 1, wherein each rectifier device is a diode.

6. The power conversion apparatus according to claim 5, further comprising:
an nth capacitor which is physically disposed between an nth switch side terminal between the nth switch and the fourth power supply terminal, and an nth rectifier device side terminal between the nth rectifier device and the third power supply terminal, and which is electrically connected between the nth switch side terminal and the nth rectifier device side terminal.

7. The power conversion apparatus according to claim 5, wherein the first power supply terminal and the second power supply terminal are power input terminals, and
the third power supply terminal and the fourth power supply terminal are power output terminals,
the power conversion apparatus being a step-up chopper.

8. The power conversion apparatus according to claim 5, wherein the first power supply terminal and the second power supply terminal are power output terminals, and
the third power supply terminal and the fourth power supply terminal are power input terminals,
the power conversion apparatus being a step-down chopper.

9. The power conversion apparatus according to claim 1, wherein each rectifier device is a switch.

10. The power conversion apparatus according to claim 9, wherein the first power supply terminal and the second power supply terminal are power output terminals, and
the third power supply terminal and the fourth power supply terminal are power input terminals,
the power conversion apparatus being an inverter.

11. A power supply apparatus comprising:
a plurality of the power conversion apparatuses according to claim 1 connected in parallel; and
a power supply either connected to the first power supply terminal and the second power supply terminal, or connected to the third power supply terminal and the fourth power supply terminal.

12. The power supply apparatus according to claim 11, wherein at least one of the $1^{st}$ to nth switches and the $1^{st}$ to nth rectifier devices includes a wide band gap semiconductor.

* * * * *